United States Patent
Legl et al.

(10) Patent No.: US 12,155,289 B2
(45) Date of Patent: Nov. 26, 2024

(54) HOUSING FOR AN ELECTRIC MACHINE AND ELECTRIC MACHINE COMPRISING SUCH A HOUSING

(71) Applicant: MAGNA Powertrain GmbH & Co. KG, Lannach (AT)

(72) Inventors: Lukas Legl, Graz (AT); Andreas Penz, Krottendorf (AT); Alexander Dietrich, Ehrenhausen (AT); Gerhard Eibler, Heiligenkreuz a.W. (AT)

(73) Assignee: MAGNA Powertrain GmbH & Co. KG, Lannach (AT)

( * ) Notice: Subject to any disclaimer, the term of this patent is extended or adjusted under 35 U.S.C. 154(b) by 319 days.

(21) Appl. No.: 17/778,914

(22) PCT Filed: Nov. 18, 2020

(86) PCT No.: PCT/EP2020/082578
§ 371 (c)(1),
(2) Date: May 23, 2022

(87) PCT Pub. No.: WO2021/104970
PCT Pub. Date: Jun. 3, 2021

(65) Prior Publication Data
US 2022/0416612 A1 Dec. 29, 2022

(30) Foreign Application Priority Data
Nov. 29, 2019 (DE) ...................... 10 2019 218 583.5

(51) Int. Cl.
*H02K 5/20* (2006.01)
*H02K 5/173* (2006.01)
*H02K 9/19* (2006.01)

(52) U.S. Cl.
CPC ........... *H02K 5/203* (2021.01); *H02K 5/1732* (2013.01); *H02K 9/19* (2013.01)

(58) Field of Classification Search
CPC ............ H02K 5/20; H02K 5/203; H02K 9/19; H02K 5/04; H02K 5/1732
See application file for complete search history.

(56) References Cited

U.S. PATENT DOCUMENTS

2009/0026857 A1* 1/2009 Lavall .................... H02K 5/203
310/58
2011/0298315 A1* 12/2011 Fulton ...................... H02K 9/19
310/54
(Continued)

FOREIGN PATENT DOCUMENTS

CN 208723683 U 4/2019
DE 102005052363 A1 5/2007
(Continued)

OTHER PUBLICATIONS

DE102011008945A1 Machine Translation (Year: 2012).*
(Continued)

*Primary Examiner* — Daniel C Puentes
*Assistant Examiner* — Masoud Vaziri
(74) *Attorney, Agent, or Firm* — Dickinson Wright PLLC

(57) ABSTRACT

A housing for an electric machine includes a substantially cup-shaped outer housing having a first base portion and a first tubular portion adjoining the base portion. An inner housing, which has a substantially cup-shaped form, is arranged in the outer housing and has a second base portion and a second tubular portion adjoining the base portion. A cover is connected or connectable to the outer housing and/or the inner housing. At least one cooling channel is formed between the first tubular portion and the second tubular portion. A pocket is formed in the first base portion and forms a first cavity together with the second base portion, and a second cavity is formed in the cover. The first cavity is fluidically connected to the cooling channel via a
(Continued)

first bore and the second cavity is fluidically connected to the cooling channel via a second bore.

21 Claims, 3 Drawing Sheets

(56) References Cited

U.S. PATENT DOCUMENTS

| | | | |
|---|---|---|---|
| 2014/0077635 A1* | 3/2014 | Hossain | H02K 15/12 |
| | | | 310/64 |
| 2014/0246177 A1 | 9/2014 | Chamberlin et al. | |
| 2014/0354090 A1 | 12/2014 | Chamberlin | |
| 2017/0324305 A1* | 11/2017 | Chamberlin | H02K 9/19 |
| 2018/0278119 A1* | 9/2018 | Carrillo | H02K 5/18 |
| 2019/0006908 A1* | 1/2019 | Scharlach | H02K 5/203 |
| 2019/0222090 A1* | 7/2019 | Li | H02K 5/207 |

FOREIGN PATENT DOCUMENTS

| | | | | |
|---|---|---|---|---|
| DE | 102011008945 A1 * | 7/2012 | | H02K 5/20 |
| EP | 2479875 A2 | 7/2012 | | |
| JP | 2015129570 A | 7/2015 | | |
| WO | 2012128003 A1 | 9/2012 | | |
| WO | 2018153598 A1 | 8/2018 | | |

OTHER PUBLICATIONS

European Patent Office, Rijswijk, Netherlands, International Search Report of International Application No. PCT/EP2020/082578, Mailed Feb. 19, 2021, 2 pages.

* cited by examiner

HOUSING FOR AN ELECTRIC MACHINE AND ELECTRIC MACHINE COMPRISING SUCH A HOUSING

CROSS-REFERENCE TO RELATED APPLICATIONS

This application is a National Stage of International Application No. PCT/EP2020/082578, filed Nov. 18, 2020, which claims priority to DE 10 2019 218 583.5 filed Nov. 29, 2019. The entire disclosures of each of the above applications are incorporated herein by reference.

FIELD OF THE DISCLOSURE

The present disclosure relates to a housing for an electric machine including a substantially cup-shaped outer housing having a first base portion and a first tubular portion adjoining said base portion, an inner housing, which has a substantially cup-shaped form and is arranged in the outer housing and has a second base portion and a second tubular portion adjoining the base portion, and a cover. The cover is connected or connectable to the outer housing and/or the inner housing. At least one cooling channel is formed between the first tubular portion and the second tubular portion. The disclosure furthermore relates to an electric machine comprising such a housing

BACKGROUND

This section provides information related to the present disclosure which is not necessarily prior art.

To cool electric machines, it is generally known to use a one-part or two-part housing having an integrated cooling jacket, in particular for liquid cooling. In this case, the cooling jacket is generally configured in a meandering shape on the jacket of the housing. The cooling or temperature control of individual components of the electric machine, for example bearing cooling of rotor bearings or the cooling of winding heads, is often inadequate in such housings.

SUMMARY

This section provides a general summary of the disclosure, and is not a comprehensive disclosure of its full scope or all of its features The object of the present disclosure is to specify an improved housing for an electric machine, which is notable for a simple design which is optimized in terms of cost. An object of the present invention is to furthermore specify an improved electric machine, which is notable in particular for optimized cooling of individual components, for example winding heads and rotor bearings, of an electric machine.

These and other objects can be met by the subject matter of the present disclosure as described herein. Advantageous embodiments of the present disclosure are also described According to the present disclosure, the housing for an electric machine comprises an outer housing, an inner housing, and a cover.

According to the present disclosure, the outer housing and the inner housing have a substantially cup-shaped form, namely with a respective base portion and a tubular portion adjoining said base portion. The outer housing has a first base portion and a first tubular portion; the inner housing has a second base portion and a second tubular portion.

According to the present disclosure, the inner housing is arranged in the outer housing and the cover is connected or connectable to the outer housing and/or the inner housing. In this context, the concept "connected" shall describe a fixed connection between the cover and the outer housing and/or the inner housing. In this context, the concept "connectable" shall describe an optionally releasable connection between the cover and the outer housing and/or the inner housing.

According to the present disclosure, at least one cooling channel is furthermore formed between the first tubular portion of the outer housing and the second tubular portion of the inner housing.

According to the present disclosure, a pocket is formed in the first base portion of the outer housing, which pocket forms a first cavity with the second base portion of the inner housing. According to the present disclosure, a second cavity is formed in the cover. According to the present disclosure, the first cavity is fluidically connected to the cooling channel via a first bore and the second cavity is fluidically connected to the cooling channel via a second bore.

The housing according to the present disclosure is notable for a simple design, which enables cooling for an electric machine to be achieved in a simple manner.

In a preferred embodiment of the present disclosure, the cover is connected to the outer housing and/or to the inner housing, namely to the first tubular portion and/or to the second tubular portion, via a friction stir welded joint.

The first base portion of the outer housing preferably has a first central opening and the second base portion of the inner housing preferably has a second central opening, wherein the first central opening and the second central opening overlap both axially and radially, wherein a first sealing element is arranged between the first base portion of the outer housing and the second base portion of the inner housing, in the region of the central openings. A second sealing element is furthermore preferably arranged between the second tubular portion of the inner housing and the cover, in the region of the second bore. A leak-tight cooling system for the electric machine can thus be achieved without mechanical connections between the outer housing and the inner housing, which are often difficult to achieve at the said points.

In this context, the directional specification "axially" is understood to mean a direction along or parallel to an axis of rotation of an electric machine. In this context, the directional specification "radially" is understood to mean a direction normal to the axis of rotation of an electric machine.

An electric machine according to the present disclosure includes a rotor and a stator and a housing as described herein, wherein the rotor and the stator are arranged in the housing.

According to the present disclosure, in particular the housing of the electric machine, it is possible to achieve effective cooling of all temperature-critical components of the electric machine in a simple manner.

Further areas of applicability will become apparent from the description provided herein. The description and specific examples in this summary are intended for purposes of illustration only and are not intended to limit the scope of the present disclosure

BRIEF DESCRIPTION OF THE DRAWINGS

The drawings described herein are for illustrative purposes only of selected embodiments and not all possible implementations and are not intended to limit the scope of the present disclosure, in which.

DETAILED DESCRIPTION

Figure 1:
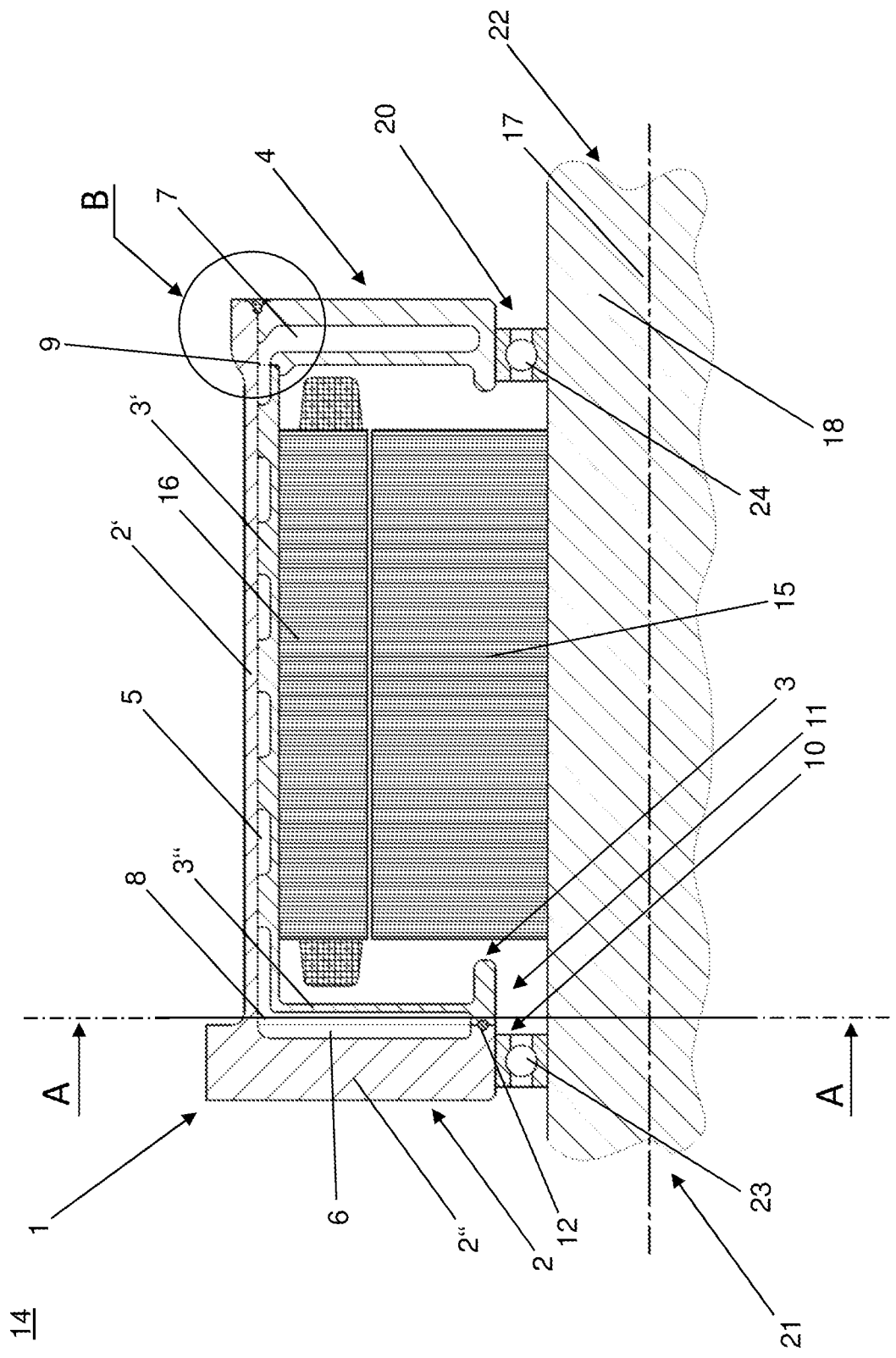
FIG. 1 shows a schematic sectional view of a detail of an electric machine.
Figure 2:
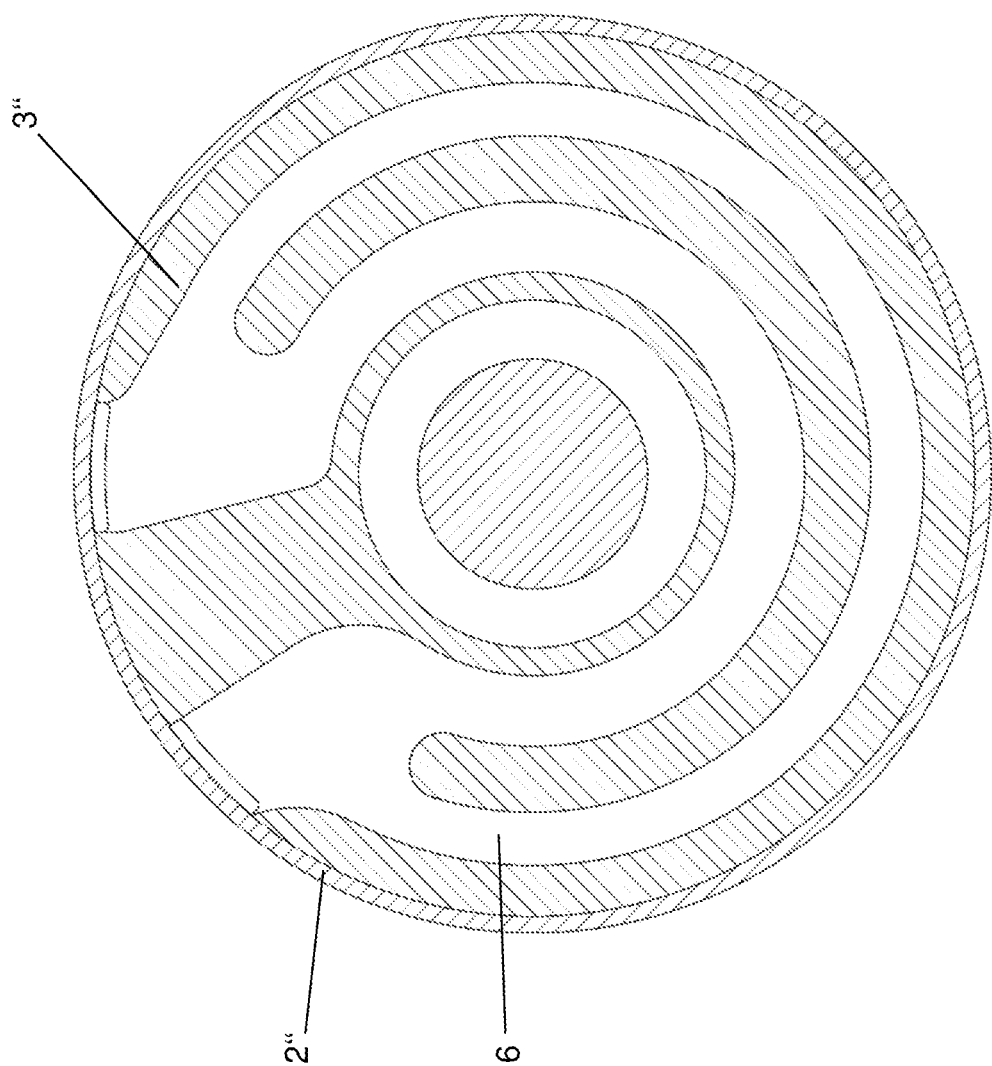
FIG. 2 shows a cross-sectional illustration along the section plane A-A according to FIG. 1.
Figure 3:
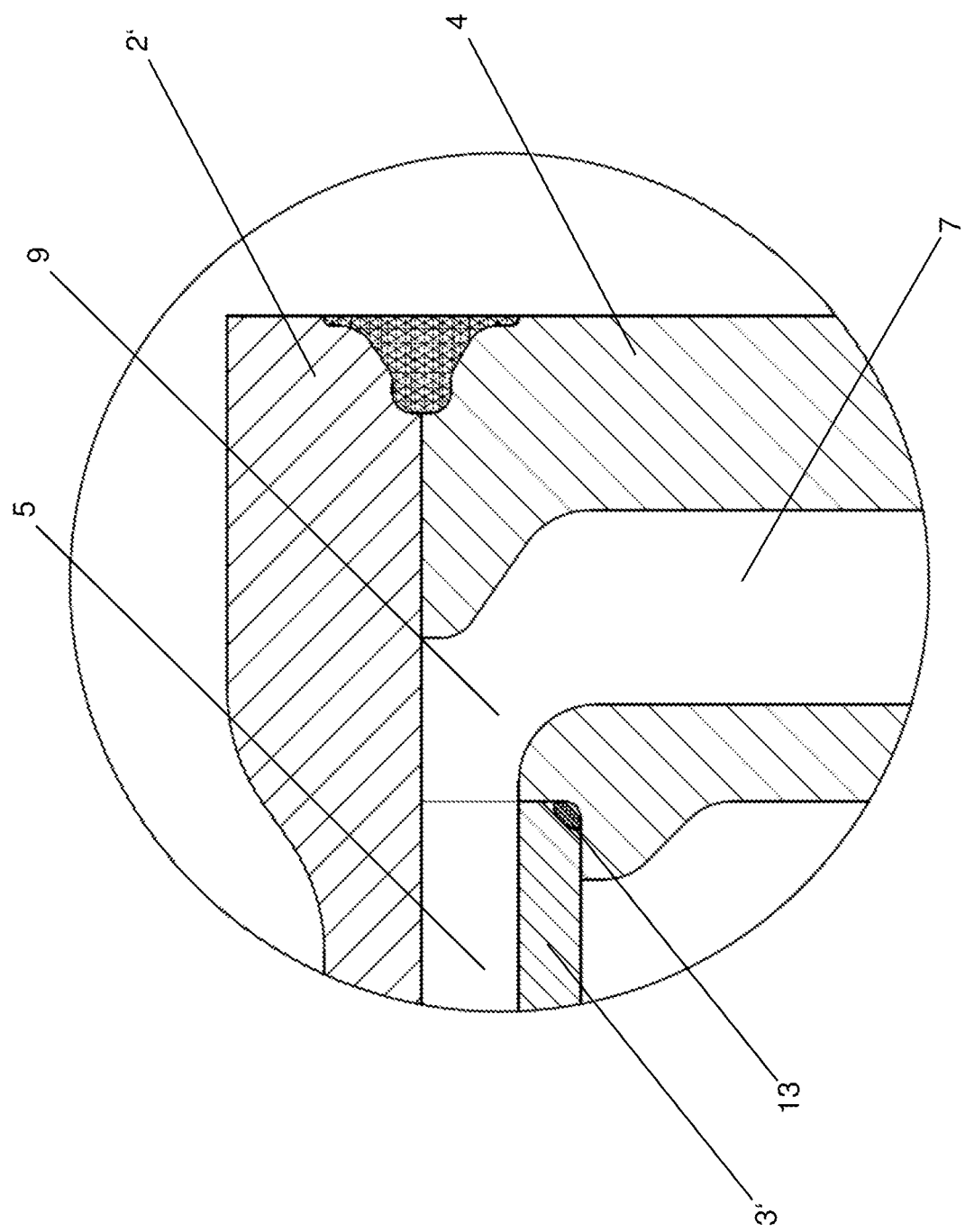
FIG. 3 shows a detailed view according to the indicated detail B in FIG. 1.

A detail of an electric machine 14 is illustrated in a sectional view in FIG. 1.

The electric machine 14 includes a rotor 15, a stator 16, and a housing 1.

The stator 16 of the electric machine 14 generally refers to a stationary part of the electric machine 14, where the rotor 15 represents a moving part of the electric machine 14. The rotor 15 is arranged or mounted within the stator 16. The rotor 15 is arranged in a fixed manner on a rotor shaft 18, which is rotatable about an axis of rotation 17. The stator 16 has a plurality of windings, which are each interconnected at the end face of the stator to form winding heads 19.

The directional specification "axially" is subsequently understood to mean a direction along or parallel to the axis of rotation 17 of the electric machine 14 (shown extending left to right in FIG. 1). The directional specification "radially" is understood to mean a direction normal to the axis of rotation 17 of an electric machine 14.

The housing 1 includes an outer housing 2, an inner housing 3, and a cover 4.

The outer housing 2 and the inner housing 3 have a substantially cup-shaped form. The outer housing 2 has a first base portion 2" and a first tubular portion 2' adjoining the base portion 2". The inner housing 3 has a second base portion 3" and a second tubular portion 3' adjoining the base portion 3".

The inner housing 3 is arranged in the outer housing 2 and the cover 4 is fixedly connected to the outer housing 2, namely via a friction stir welded joint between the outer housing 2 and the cover 4. A cooling channel 5 is formed between the first tubular portion 2' of the outer housing 2 and the second tubular portion 3' of the inner housing 3, which cooling channel extends in a meandering shape over the region of the tubular portions 2', 3'.

The first base portion 2" of the outer housing 2 has a first central opening 10. The second base portion 3" of the inner housing 3 has a second central opening 11. The first central opening 10 and the second central opening 11 overlap both axially and radially. The cover 4 furthermore has a further central opening, namely a third central opening 20, which is configured coaxially to the first central opening 10 of the first base portion 2" of the outer housing 2 and to the second central opening 11 of the second base portion 3" of the inner housing 3.

A first end 21 of the rotor shaft 18 extends axially, namely along the axis of rotation 17, through the second central opening 11 of the inner housing 3 and the first central opening 10 of the outer housing 2. A second end 22, namely an end opposite the first end 21, of the rotor shaft 18 extends axially through the third central opening 20 of the cover 4. The rotor shaft 18 is mounted on the outer housing 2 of the housing 1 via a first bearing 23 in the region of the first end 21. The rotor shaft 18 is mounted on the cover 4 of the housing 1 via a second bearing 24 in the region of the second end 22.

A pocket is formed in the first base portion 2" of the outer housing 2, which pocket forms a first cavity 6 with the second base portion 3". A second cavity 7 is formed in the cover. The first cavity 6 is fluidically connected to the cooling channel 5 via a first bore 8. The second cavity 7 is fluidically connected to the cooling channel 5 via a second bore 9.

A first sealing element 12 is arranged between the first base portion 2" of the outer housing 2 and the second base portion 3" of the inner housing 3, in the region of the central openings 10, 11. A second sealing element 13 is furthermore arranged between the second tubular portion 3' of the inner housing 3 and the cover 4, in the region of the second bore 9.

LIST OF REFERENCE SIGNS

1 Housing
2 Outer housing
2' First tubular portion (of the outer housing)
2" First base portion (of the outer housing)
3 Inner housing
3' Second tubular portion (of the inner housing)
3" Second base portion (of the inner housing)
4 Cover
5 Cooling channel
6 First cavity
7 Second cavity
8 First bore
9 Second bore
10 First central opening (of the base portion of the outer housing)
11 Second central opening (of the base portion of the inner housing)
12 First sealing element
13 Second sealing element
14 Electric machine
15 Rotor
16 Stator
17 Axis of rotation (of the electric machine)
18 Rotor shaft
19 Winding heads
20 Third central opening (of the cover)
21 First end of the rotor shaft
22 Second end of the rotor shaft
23 First bearing
24 Second bearing

What is claimed is:

1. A housing (1) for an electric machine (14), the housing comprising:
   a substantially cup-shaped outer housing having a first base portion and a first tubular portion adjoining said base portion,
   an inner housing, which has a substantially cup-shaped form, arranged in the outer housing and having a second base portion and a second tubular portion adjoining said base portion, and
   a cover, wherein the cover is connected or connectable to the outer housing or the inner housing,
   wherein at least one cooling channel is formed between the first tubular portion and the second tubular portion,
   wherein a pocket is formed in the first base portion, which pocket forms a first cavity together with the second base portion,
   wherein a second cavity is formed in the cover,
   wherein the first cavity is fluidically connected to the cooling channel via a first bore and the second cavity is fluidically connected to the cooling channel via a second bore.

2. The housing as claimed in claim 1, wherein the cover is connected to the outer housing or the inner housing via a friction stir welded joint.

3. The housing as claimed in claim 1, wherein the first base portion has a first central opening and the second base portion has a second central opening, wherein the first central opening and the second central opening overlap radially.

4. The housing as claimed in claim 3, wherein the cover is connected to the inner housing, and an inner sealing element is arranged between the second tubular portion of the inner housing and the cover in a region of the second bore.

5. An electric machine comprising:
a rotor,
a stator, and
a housing, wherein the housing includes:
   a substantially cup-shaped outer housing having a first base portion and a first tubular portion adjoining said base portion,
   an inner housing, which has a substantially cup-shaped form, arranged in the outer housing and having a second base portion and a second tubular portion adjoining said base portion, and
   a cover, wherein the cover is connected or connectable to the outer housing or the inner housing,
   wherein at least one cooling channel is formed between the first tubular portion and the second tubular portion,
   wherein a pocket is formed in the first base portion, which pocket forms a first cavity together with the second base portion,
   wherein a second cavity is formed in the cover,
   wherein the first cavity is fluidically connected to the cooling channel via a first bore and the second cavity is fluidically connected to the cooling channel via a second bore,
   wherein the rotor and the stator are arranged in the housing.

6. The housing as claimed in claim 1, wherein the cooling channel extends in a meandering shape over a region of the first and second tubular portions.

7. The housing as claimed in claim 1, wherein the first cavity is disposed at a first end of the housing, and the second cavity is disposed at a second end of the housing.

8. The housing as claimed in claim 7, wherein the cooling channel is disposed axially between the first and second cavities.

9. The housing as claimed in claim 3, wherein at least a further sealing element is arranged between the first base portion of the outer housing and the second base portion of the inner housing in a region of the first and second central openings.

10. The housing as claimed in claim 9, wherein the first and second central openings are axially adjacent, and the further sealing element is arranged adjacent an axial interface defined between the first base portion of the outer housing that defines the first central opening and the second base portion of the inner housing that defines the second central opening.

11. The housing as claimed in claim 3, wherein the cover defines a third central opening, wherein the third central opening overlaps radially with the first and second central openings, and the third central opening is axially remote from the first and second central openings.

12. The housing as claimed in claim 11, further comprising a first bearing element disposed in the first or second central opening, and a second bearing element disposed in the third central opening.

13. The housing as claimed in claim 1, wherein the cover is connected to both the inner housing and the outer housing.

14. The housing as claimed in claim 13, wherein the cover has a first portion axially offset from a second portion, wherein the second cavity is defined by the first and the second portion of the cover, wherein the first portion has a greater outer diameter than the second portion, wherein the first portion is connected to the outer housing and the second portion is connected to the inner housing, wherein the second portion has a radially outer edge that is radially recessed relative to the a radially outer edge of the first portion;
   wherein the cover is nested axially and radially within the outer housing wall, wherein the second portion of the cover abuts an axial end portion the inner housing at an inner interface, wherein the axial end portion of the inner housing is axially recessed relative to an axial end of the outer housing.

15. The electric machine as claimed in claim 5, wherein the stator is attached to the inner portion, and the rotor is disposed radially inward relative to the stator.

16. The electric machine as claimed in claim 15, wherein a shaft is attached to the rotor and rotates with the rotor.

17. The electric machine as claimed in claim 16, wherein the shaft is supported on bearings disposed radially between the housing and the shaft.

18. The electric machine as claimed in claim 16, wherein the outer housing and the inner housing define respective first and second central openings that are axially adjacent and overlap radially, wherein the cover defines a third central opening that is axially offset from the first and second central openings, wherein the shaft extends axially through the first, second, and third central openings.

19. The electric machine as claimed in claim 5, wherein the cooling channel extends in a meandering shape over a region of the first and second tubular portions.

20. The electric machine as claimed in claim 5, wherein the first cavity is disposed at a first end of the housing, and the second cavity is disposed at a second end of the housing, wherein the cooling channel is disposed axially between the first and second cavities.

21. The housing as claimed in claim 1, wherein the inner housing is formed as a unitary and homogenous structure, wherein the outer housing is formed as a unitary and homogeneous structure, and wherein the cover is formed as a unitary and homogeneous structure.

* * * * *